United States Patent
Swamy et al.

(10) Patent No.: US 9,984,194 B2
(45) Date of Patent: May 29, 2018

(54) INTEGRATED CIRCUIT DESIGN (71) Applicant: ARM LIMITED, Cambridge (GB)

(72) Inventors: Ramnath Bommu Sabbiah Swamy, Sheffiel (GB); Robert John Harrison, Sheffield (GB)

(73) Assignee: ARM Limited, Cambridge (GB)

( * ) Notice: Subject to any disclaimer, the term of this patent is extended or adjusted under 35 U.S.C. 154(b) by 1 day.

(21) Appl. No.: 14/854,247

(22) Filed: Sep. 15, 2015

(65) Prior Publication Data

US 2017/0076033 A1    Mar. 16, 2017

(51) Int. Cl.
G06F 17/50 (2006.01)
H01L 27/02 (2006.01)
H01L 27/146 (2006.01)

(52) U.S. Cl.
CPC ...... G06F 17/5081 (2013.01); G06F 17/5072 (2013.01); *G06F 17/505* (2013.01); *G06F 17/5036* (2013.01); *G06F 2217/84* (2013.01); *H01L 27/0207* (2013.01); *H01L 27/14603* (2013.01)

(58) Field of Classification Search
CPC ............. G06F 17/5036; G06F 17/505; G06F 17/30991; G06F 3/0484; G06F 17/5081; G06F 17/5072; H01L 27/14603
See application file for complete search history.

(56) References Cited

U.S. PATENT DOCUMENTS

| | | | | |
|---|---|---|---|---|
| 5,168,455 A * | 12/1992 | Hooper | ................. | G06F 17/505 716/108 |
| 5,826,067 A * | 10/1998 | Fisch | ........................ | G06F 1/12 713/503 |
| 6,208,180 B1 * | 3/2001 | Fisch | ........................ | G06F 1/12 327/141 |
| 6,557,150 B1 * | 4/2003 | Honmura | ............ | G06F 17/5022 716/113 |
| 6,813,751 B2 * | 11/2004 | Kubista | .......... | G01R 31/318314 716/102 |
| 6,817,000 B2 * | 11/2004 | Rich | .................... | G06F 17/5022 703/14 |
| 6,854,096 B2 * | 2/2005 | Eaton | .................... | G06F 17/505 716/122 |

(Continued)

Primary Examiner — Helen Rossoshek
(74) Attorney, Agent, or Firm — Nixon & Vanderhye P.C.

(57) ABSTRACT

A computer-implemented method of integrated circuit design comprises: using a computer, producing an integrated circuit layout for multiple instances of a circuitry element, wherein interface components in one instance of said circuitry element communicate with complementary interface components in an adjacent instance of said circuitry element, said interface components being identical between said multiple instances; said producing step comprising: for one instance of said circuitry element, generating an integrated circuit layout for said one instance of said circuitry element on the basis of timing parameters of said complementary interface components with which said one instance communicates in use; detecting timing characteristics of said interface components of said one instance of said circuitry element; applying said detected timing characteristics as said timing parameters of said complementary interface components; and repeating said generating step.

8 Claims, 5 Drawing Sheets

(56) References Cited

U.S. PATENT DOCUMENTS

| | | | | |
|---|---|---|---|---|
| 7,055,113 | B2 * | 5/2006 | Broberg, III | G06F 17/505 716/102 |
| 7,080,341 | B2 * | 7/2006 | Eisenstadt | G06F 17/505 326/81 |
| 7,085,670 | B2 * | 8/2006 | Odom | G06F 9/4411 702/127 |
| 7,113,901 | B1 * | 9/2006 | Schaumont | G06F 17/505 703/14 |
| 7,222,311 | B2 * | 5/2007 | Kaufman | G06F 17/5068 716/113 |
| 7,346,862 | B2 * | 3/2008 | Zhuang | G06F 17/505 716/102 |
| 7,363,599 | B1 * | 4/2008 | Vogenthaler | G06F 17/504 716/102 |
| 7,363,610 | B2 * | 4/2008 | Alfieri | G06F 17/5045 703/19 |
| 7,383,524 | B2 * | 6/2008 | Teig | G06F 17/505 707/999.102 |
| 7,437,698 | B2 * | 10/2008 | Deur | G06F 21/14 716/102 |
| 7,673,267 | B1 * | 3/2010 | Duong | G06F 17/5031 716/124 |
| 7,716,608 | B2 * | 5/2010 | Mithal | G06F 17/505 716/104 |
| 7,788,417 | B2 * | 8/2010 | Ford | G06F 17/5054 710/104 |
| 7,903,492 | B2 * | 3/2011 | Ide | H03K 5/15066 365/185.25 |
| 8,020,124 | B2 * | 9/2011 | Alexanian | G01R 31/318314 716/100 |
| 8,024,697 | B2 * | 9/2011 | Hamilton | G06F 17/5045 716/128 |
| 8,145,958 | B2 * | 3/2012 | Aitken | G11C 29/16 365/200 |
| 8,181,145 | B2 * | 5/2012 | Rice | G06F 17/5068 716/132 |
| 8,185,724 | B2 * | 5/2012 | Ford | G06F 11/30 712/227 |
| 8,205,175 | B2 * | 6/2012 | Waters | G06F 8/44 703/14 |
| 8,516,423 | B2 * | 8/2013 | Stamoulis | G06F 17/5036 716/110 |
| 8,549,447 | B2 * | 10/2013 | Eisenstadt | G06F 17/5054 716/100 |
| 8,639,487 | B1 * | 1/2014 | Ezer | G06F 17/505 703/13 |
| 8,645,893 | B1 * | 2/2014 | Yeung | G06F 17/5072 716/119 |
| 8,667,434 | B1 * | 3/2014 | Kim | G06F 17/505 716/100 |
| 8,675,681 | B2 * | 3/2014 | Hill | H03K 19/17732 326/38 |
| 8,756,548 | B2 * | 6/2014 | Zievers | G06F 15/781 703/16 |
| 8,875,082 | B1 * | 10/2014 | Sircar | G06F 17/5068 716/110 |
| 8,914,762 | B1 * | 12/2014 | Sinclair | G06F 17/505 716/103 |
| 9,281,049 | B1 * | 3/2016 | Magee | G11C 11/409 |
| 2009/0013292 | A1 * | 1/2009 | Brunet | G06F 17/5031 716/113 |
| 2009/0070720 | A1 * | 3/2009 | Bergamaschi | G06F 17/5031 716/113 |
| 2012/0017186 | A1 * | 1/2012 | Amundson | G06F 17/5045 716/104 |
| 2012/0176155 | A1 * | 7/2012 | Weber | H03K 19/17736 326/38 |
| 2012/0272089 | A1 * | 10/2012 | Hatfield | G06F 13/4291 713/501 |
| 2013/0263070 | A1 * | 10/2013 | Brunham | G06F 17/505 716/104 |
| 2014/0192583 | A1 * | 7/2014 | Rajan | G11C 7/10 365/63 |
| 2015/0012903 | A1 * | 1/2015 | Olgiati | G06F 17/5027 716/136 |
| 2015/0178435 | A1 * | 6/2015 | Kumar | G06F 17/505 716/114 |
| 2016/0239454 | A1 * | 8/2016 | Borland | G06F 13/385 |

\* cited by examiner

INTEGRATED CIRCUIT DESIGN

BACKGROUND

This disclosure relates to integrated circuit design.

Some integrated circuits are prepared as a physical layout (for fabrication on a substrate) by a computerised layout system such as a so-called EDA (electronic design automation) tool.

The input to an EDA tool can comprise a coded definition of the logic functions and their interconnections to be implemented, and the EDA tool arranges appropriate modules or individual components on a design layout for fabrication as the integrated circuit, in order to achieve the required functionality defined by the coded representation. The coded definition may include multiple instances of electronic circuitry elements such as processor cores or the like.

In doing this, the EDA tool may have to take into account not only the required logic functionality, but also timing considerations so that data being passed from one component to another, or by one of the other interfaces from one instance of a circuitry element to another, complies with restrictions such as the need to complete a data transfer by a next-following clock edge and the like.

SUMMARY

In an example arrangement there is provided a computer-implemented method of integrated circuit design, said method comprising:

using a computer, producing an integrated circuit layout for multiple instances of a circuitry element, wherein interface components in one instance of said circuitry element communicate with complementary interface components in an adjacent instance of said circuitry element, said interface components being identical between said multiple instances;

said producing step comprising:
for one instance of said circuitry element,
generating an integrated circuit layout for said one instance of said circuitry element on the basis of timing parameters of said complementary interface components with which said one instance communicates in use;
detecting timing characteristics of said interface components of said one instance of said circuitry element;
applying said detected timing characteristics as said timing parameters of said complementary interface components; and
repeating said generating step.

In another example arrangement there is provided a computer-implemented method of manufacturing an integrated circuit comprising:

using a computer, producing an integrated circuit layout for multiple instances of a circuitry element, wherein interface components in one instance of said circuitry element communicate with complementary interface components in an adjacent instance of said circuitry element, said interface components being identical between said multiple instances;
said producing step comprising:
for one instance of said circuitry element,
generating an integrated circuit layout for said one instance of said circuitry element on the basis of timing parameters of said complementary interface components with which said one instance communicates in use;
detecting timing characteristics of said interface components of said one instance of said circuitry element;
applying said detected timing characteristics as said timing parameters of said complementary interface components;
repeating said generating step; and
using said layout generated for said one instance for each of said multiple instances of said circuitry element; and
manufacturing said integrated circuit using said layout generated by said producing step:

In another example arrangement there is provided integrated circuit design apparatus comprising a computer processor configured to operate according to program instructions which, when executed by said computer processor, cause said computer processor:

to produce an integrated circuit layout for multiple instances of a circuitry element wherein interface components in one instance of said circuitry element communicate with complementary interface components in an adjacent instance of said circuitry element, said interface components being identical between said multiple instances; and
for one instance of said circuitry element,
to iteratively generate an integrated circuit layout for said one instance of said circuitry element on said basis of timing parameters of said complementary interlace components with which said one instance communicates in use;
to detect timing characteristics of said interface components of said one instance of said circuitry element; and
to apply said detected timing characteristics as said timing parameters of said complementary interface components:

In another example arrangement there is provided a computer program product comprising a non-transitory machine-readable storage medium on which is stored program instructions which, when executed by a computer processor, cause said computer processor to perform an integrated circuit design method comprising:

producing an integrated circuit layout for multiple instances of a circuitry element wherein interface components in one instance of said circuitry element communicate with complementary interface components in an adjacent instance of said circuitry element, said interface components being identical between said multiple instances;
said producing step comprising:
for one instance of said circuitry element,
generating an integrated circuit layout for said one instance of said circuitry element on said basis of timing parameters of said complementary interface components with which said one instance communicates in use;
detecting timing characteristics of said interface components of said one instance of said circuitry element;
applying said detected timing characteristics as said timing parameters of said complementary interface components; and
repeating said generating step.

Further respective aspects and features of the present technology are defined by the appended claims.

BRIEF DESCRIPTION OF THE DRAWINGS

The present technique will be described further, by way of example only, with reference to embodiments thereof as illustrated in the accompanying drawings, in which.

DESCRIPTION OF EMBODIMENTS

Before discussing the embodiments with reference to the accompanying figures, the following description of embodiments is provided.

An example embodiment provides a computer-implemented method of integrated circuit design, said method comprising:

using a computer, producing an integrated circuit layout for multiple instances of a circuitry element, wherein interface components in one instance of said circuitry element communicate with complementary interface components in an adjacent instance of said circuitry element, said interface components being identical between said multiple instances;

said producing step comprising:

for one instance of said circuitry element, generating an integrated circuit layout for said one instance of said circuitry element on the basis of timing parameters of said complementary interface components with which said one instance communicates in use;

detecting timing characteristics of said interface components of said one instance of said circuitry element;

applying said detected timing characteristics as said timing parameters of said complementary interface components; and repeating said generating step.

The present disclosure recognises that, in the preparation of a layout of an integrated circuit having multiple instances of a circuitry element in which at least interface components are the same from instance to instance, timing information obtained in respect of the layout of an instance can be used as timing information of complementary interface components of an adjacent instance in order to allow the instance to instance communication timing to be modelled and compared with timing constraints.

In examples, said repeating step comprises: comparing said detected timing characteristics with a required communications cycle time to detect whether communication can take place between said interface components and said complementary interface components within said required communications cycle time; and repeating said generating step when said comparing step detects that communication cannot take place between said interface components and said complementary interface components within said required communications cycle time. For example, the generating step may be iteratively repeated until said comparing step detects that communication can take place between said interface components and said complementary interface components within said required communications cycle time. The iterative repetition may be in an automated manner and may, as described, continue, using iteratively modified timing data, until a layout is reached in which the timing constraints are met.

Although just the interface components may be identical between instances, in example embodiments said instances of said circuitry element are identical between said multiple instances.

Example interface components of said one instance of said circuitry element comprise: input components, said complementary interface components in said adjacent instance being output components; and output components, said complementary interface components in said adjacent instance being input components.

Although various types of circuitry element may be used, in example embodiments said circuitry elements are processor cores.

As part of the iterative generation of the layout, said generating step comprises selecting one or both of a layout and a component structure of one or more of said interface components, for example in order to provide a layout which can aim to meet the timing constraints.

An example embodiment of the present disclosure comprises an integrated circuit having an integrated circuit layout produced by the method defined above.

An example embodiment provides a computer-implemented method of manufacturing an integrated circuit comprising:

using a computer, producing an integrated circuit layout for multiple instances of a circuitry element, wherein interface components in one instance of said circuitry element communicate with complementary interface components in an adjacent instance of said circuitry element, said interface components being identical between said multiple instances;

said producing step comprising:

for one instance of said circuitry element, generating an integrated circuit layout for said one instance of said circuitry element on said basis of timing parameters of said complementary interface components with which said one instance communicates in use;

detecting timing characteristics of said interface components of said one instance of said circuitry element;

applying said detected timing characteristics as said timing parameters of said complementary interface components;

repeating said generating step; and using said layout generated for said one instance for each of said multiple instances of said circuitry element; and manufacturing said integrated circuit using said layout generated by said producing step.

An example embodiment comprises an integrated circuit manufactured according to the manufacturing method as defined above.

An example embodiment provides an integrated circuit design apparatus comprising a computer processor configured to operate according to program instructions which, when executed by said computer processor, cause said computer processor:

to produce an integrated circuit layout for multiple instances of a circuitry element wherein interface components in one instance of said circuitry element communicate with complementary interface components in an adjacent instance of said circuitry element, said interface components being identical between said multiple instances; and for one instance of said circuitry element, to iteratively generate an integrated circuit layout for said one instance of said circuitry element on said basis of timing parameters of said complementary interface components with which said one instance communicates in use;

to detect timing characteristics of said interface components of said one instance of said circuitry element; and to apply said detected timing characteristics as said timing parameters of said complementary interface components.

An example embodiment provides a computer program product comprising a non-transitory machine-readable storage medium on which is stored program instructions which, when executed by a computer processor, cause said computer processor to perform an integrated circuit design method comprising:

producing an integrated circuit layout for multiple instances of a circuitry element wherein interface components in one instance of said circuitry element communicate with complementary interface components in an adjacent instance of said circuitry element, said interface components being identical between said multiple instances;

said producing step comprising:

for one instance of said circuitry element, generating an integrated circuit layout for said one instance of said circuitry element on said basis of timing parameters of said complementary interface components with which said one instance communicates in use;

detecting timing characteristics of said interface components of said one instance of said circuitry element;

applying said detected timing characteristics as said timing parameters of said complementary interface components; and repeating said generating step.

Figure 1:
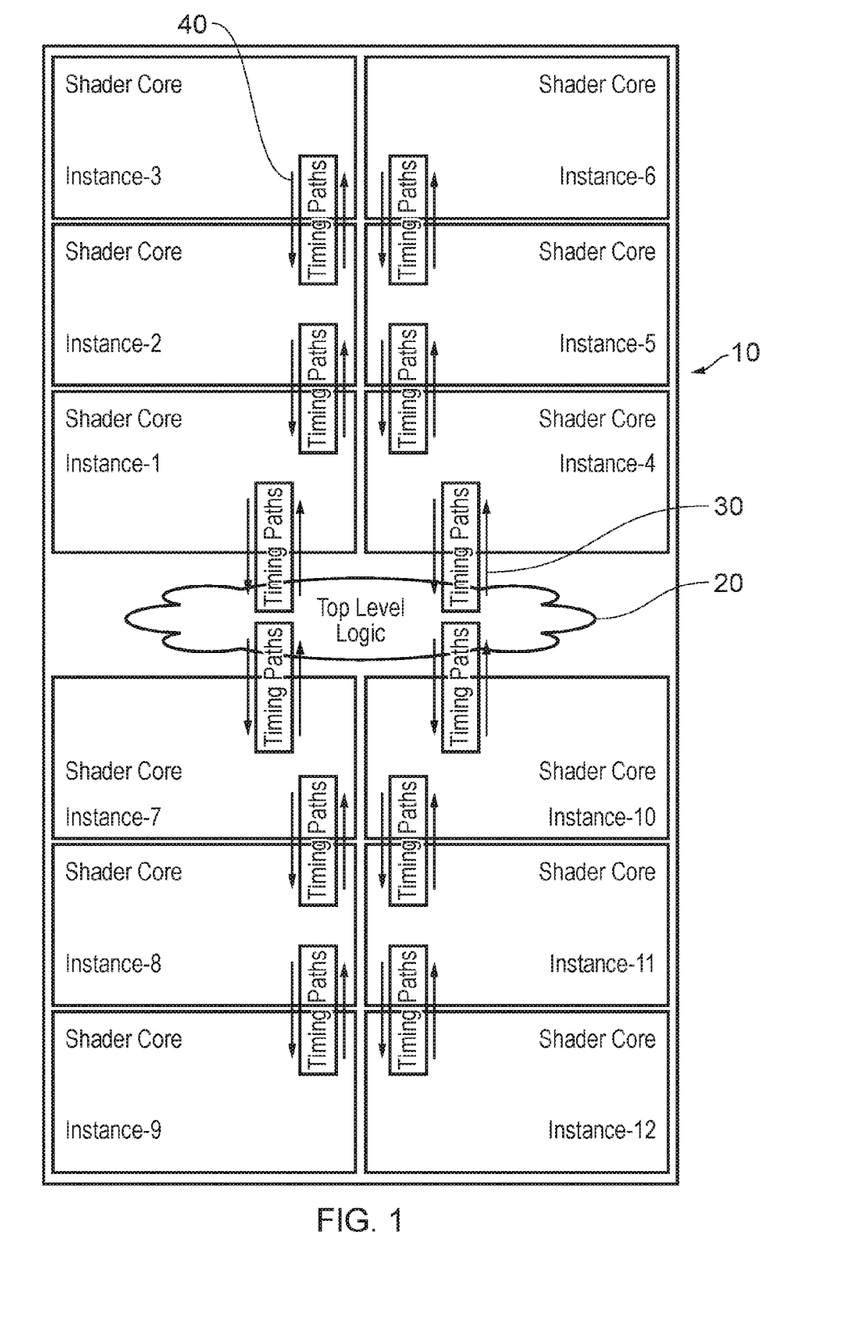
FIG. 1 schematically illustrates an integrated circuit device.

FIG. 1 schematically illustrates an integrated circuit device 10.

In common with other recent designs, the integrated circuit 10 comprises multiple instances of a circuitry element fabricated on a substrate. In the present example, the circuitry element is a so-called shader core which is a type of processing unit or core particularly applicable to graphics processing. However, the instances of the circuitry element could be any type of repeated element, such as a general processing core or other type of element. In FIG. 1, twelve instances of the shaded core (numbered as "instance-n", where n runs from 1 to 12) are shown. However, it will be appreciated that the present techniques are applicable to various different numbers of instances of the circuitry element.

So-called top level logic 20 communicates with the shader cores in FIG. 1. The top level logic is logic which oversees aspects of the operation and inter-communication of the shader cores and which may provide an interface with other components, such as components external to the integrated circuit 10. The shader cores are arranged so as to provide a direct communication path 30 between a subset of the shader cores and the top level logic 20 and an indirect communication path, via at least one other shader core, to the other shader cores. So, in FIG. 1, there is a direct communication path 30 between the top level logic and the shader cores 1, 4, 7 and 10, and an indirect communication path between the top level logic 20 and the remaining shader cores. For example, in order for the top level logic 20 to communicate with the shader core 6, the communication can be via, for example, the shader cores 4 and 5.

A result of this arrangement is that there are many sets of interfaces between shader cores, such as an interface 40, which are identical. Indeed, the shader cores themselves can be identical, but for the purposes of the present discussion at least the interfaces between them are identical. In other words, a data path or interface from an output at the shader core 3 to an input at the shader core 2 is the same in circuit terms as an interface from the shader core 6 to the shader core 5, which in turn is the same as an interface from the shader core 2 to the shader core 1, and so on.

The physical layout of components on the integrated circuit 10 is carried out in the present embodiments by a computerised layout system such as a so-called EDA (electronic design automation) tool. The input to the an EDA tool can comprise a coded definition of the logic functions and their interconnections to be implemented, and the EDA tool arranges appropriate modules or individual components on a design layout for fabrication as the integrated circuit 10, in order to achieve the required functionality defined by the coded representation. In doing this, the EDA tool has to take into account not only the required logic functionality, but also timing considerations so that data being passed from one component to another, or by one of the other interfaces 40 from one instance of a circuitry element to another, complies with restrictions such as the need to complete a data transfer by a next-following clock edge and the like. Therefore, the EDA tool may model the delay caused by various logic and other functional components in order to detect whether a particular operation such as a data transfer operation can be completed in time to comply with the timing constraints. The EDA tool has various options at its disposal to change the delay applicable to a part of the circuitry in the proposed layout. For example, the EDA tool can alter the component or module layout so as to bring various components closer to one another in the physical layout. The EDA tool also has different component structures available to it in order to implement, in the layout, particular functionality, allowing the EDA tool to select faster options if a timing constraint cannot otherwise be met.

But in order for the EDA tool to do this, it requires information about the timing constraints themselves. An issue relating to the provision of this information will be discussed with reference to FIG. 2, which schematically illustrates one instance of a circuitry element (again, in this example only, this is a shader core). The circuitry element 100 shown in FIG. 2 has input and output interfaces for connection (as an interface 40 of FIG. 1) to an adjacent shader core. These are shown generically in FIG. 2 as a flip flop plus some logic associated with the interface. The flip flops are referred to as F1 . . . F4 in FIG. 2. F2 and F4 relates to outputs from the shader core 100. F1 and F3 represent inputs to the shader core 100.

Figure 2:
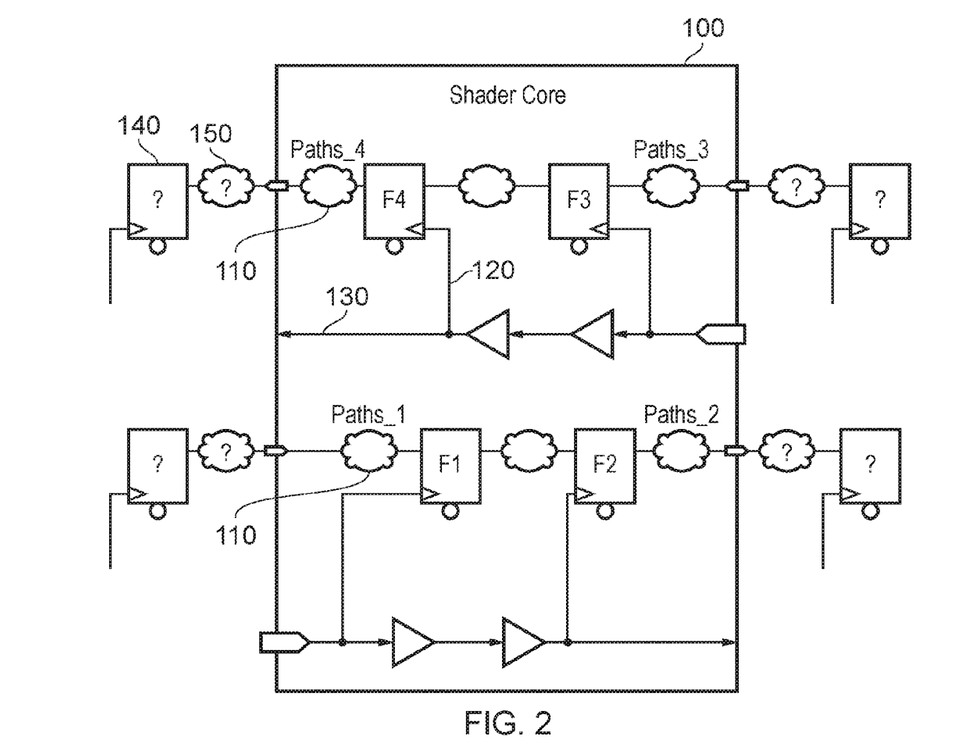
FIG. 2 schematically illustrates an instance of a circuitry element.

The input interfaces associated with F1 and F3 may be the same as one another, or they may be different. The output interfaces associated with F2 and F4 may be the same as one another, or they may be different. However, from one shader core (or other circuitry element) to another, the respective output or input interfaces associated with a particular flip flop are the same (so, for example, for each shader core, the output interfaces associated with the flip flop F4 are the same, and so on).

The associated logic is shown generically by a cloud symbol 110 between the respective flip flop and an output or input terminal of the instance of the circuitry element. Accordingly the interface components of one instance of said circuitry element can (in an example) comprise: input components, said complementary interface components in said adjacent instance being output components; and output components, said complementary interface components in said adjacent instance being input components.

Considering the flip flop F4 as an illustrative example, the flip flop itself is clocked by a clocking signal 120 which, by way of a clock bus 130, is supplied to successive shader cores in the multiple instances. Data to be passed from the shader core 100 to a next adjacent shader core is output by the flip flop F4 in accordance with a clock edge (such as a rising edge) of the clock signal 120. It needs to be received at an input flip flop 140 of the adjacent shader core at or before a next clock edge such as a next rising edge of the same clock signal (or indeed whatever clock signal is being used by the next adjacent element). However, between the flip flop F4 and the flip flop 140 there are output logic 110 of the shader core 100 and input logic 150 of the next adjacent shader core, both of which can introduce a potential transmission delay. Similar considerations apply to the other inputs and outputs of the shader code 100.

The EDA tool, when preparing an integrated circuit layout of the shader core 100, treats the shader core 100 as a single unit and plans a layout for that single instance or unit. In this context, the EDA tool may not at this stage in the process have information about the delay associated with the input logic 150 and any delay associated with the flip flop 140 (or even what type of clock signal is used by the flip flop 140) because the EDA tool is considering only the shader core 100. In the absence of such information, in order to achieve a layout for the shader core 100, therefore, the EDA tool is required to use a worst-case estimate of the delays applicable to the input of the next device, to allow the EDA tool to check that some of that worst-case delay and the delay imposed by the logic 110 does not exceed the timing constraint.

In an example, a clock period for data transfer from one element to an adjacent element may be 10 ns. The EDA tool might use an estimate that the worst-case delay at the input of the next device is 6 ns and so has to prepare a layout for the flip flop F4 and the logic 110 to provide no more than a 4 ns delay itself. However, because this is based on an estimate it may be that the estimate is (a) too pessimistic, in which case the requirements being imposed on the interface of the element being laid out are too stringent, or (b) too optimistic, in which case there may be timing problems when the EDA tool assembles the entire layout into a final integrated circuit layout, meaning that work has been wasted in producing a layout that may not be operational.

Figure 3:
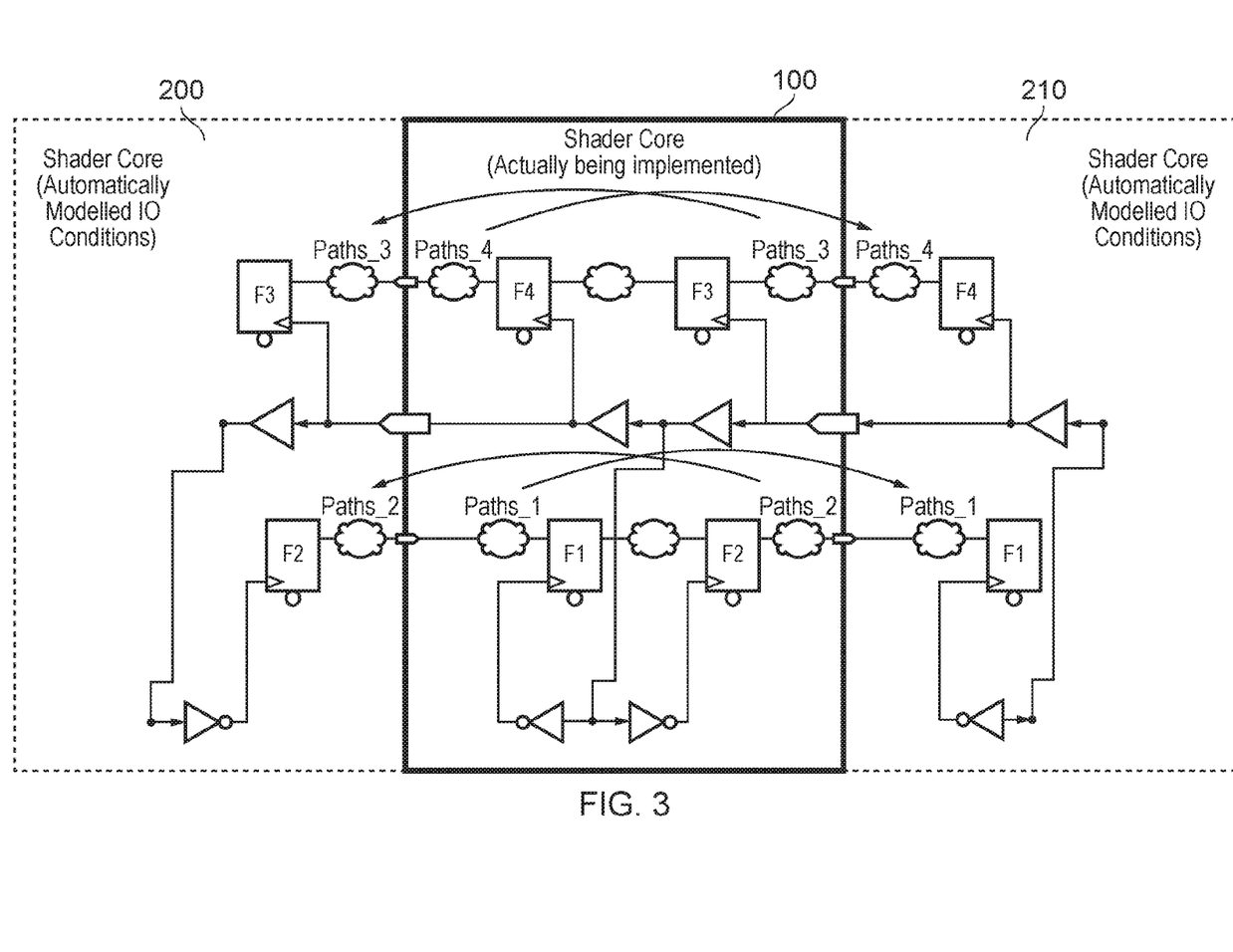
FIG. 3 schematically illustrates input/output timing considerations of a instance of a circuitry element.

FIG. 3 schematically illustrates input/output timing considerations of an instance of a circuitry element, in this case the circuitry element 100. The present disclosure recognises that the complementary interface components forming the input of the next adjacent circuitry element 200 to which the flip flop F4 transmits data will in fact be the same as the input F3 of that circuitry element, because of the repeated nature of the circuitry elements in the layout of multiply circuitry elements. Similarly, the flip flop F4 and its associated logic 110 are the same as the complementary interface components of the next adjacent shader core 210 providing an input to the flip flop F3. As mentioned above, in many situations the entire shader core may be identical from instance to instance, but a significant aspect is that the interface circuitry is identical from instance to instance. This allows a single shader core 100 to be modelled and laid out as a proposed integrated circuit layout by the EDA tool, and then the timing performance of each input and output to be used in place of the worst-case estimates mentioned above, as the expected timing performance of complementary interface components of the next-adjacent circuitry element. If the sum of the two delays (between an input or output interface of the circuitry element 100 and the complementary interface of a next-adjacent circuitry element) meet the timing constraints then the proposed layout is acceptable. If not, then the proposed layout can be amended by an iterative application of the EDA tool.

Figure 4:
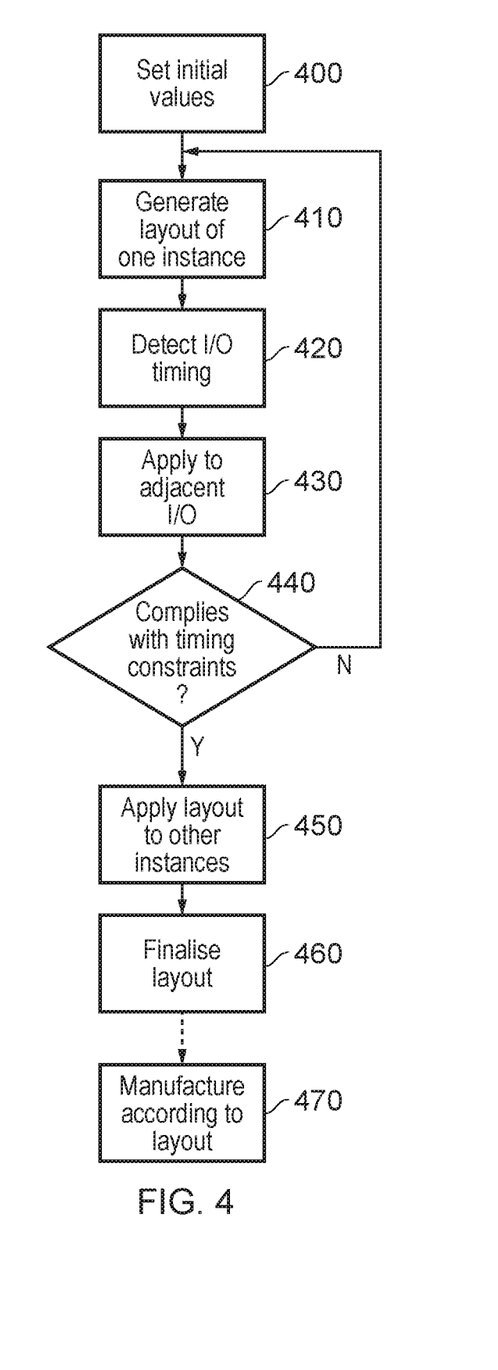
FIG. 4 is a schematic flowchart illustrating an integrated circuit layout design (and optional manufacturing) process.

Applying the principles discussed above. FIG. 4 schematically illustrates a flowchart of an integrated circuit layout design, and optional manufacturing, process, providing an example of a computer-implemented method of integrated circuit design, using a computer to produce an integrated circuit layout for multiple instances of a circuitry element, wherein interface components in one instance of said circuitry element communicate with complementary interface components in an adjacent instance of said circuitry element, said interface components being identical between said multiple instances.

At a step 400, initial values of layout parameters such as initial worst-case estimates of interface delay as discussed above, are set.

At a step 410, an integrated circuit layout is generated for one instance of said circuitry element on the basis of timing parameters of complementary interface components with which said one instance communicates in use. In a first iteration of the flowchart of FIG. 4, these would be the initial values set at the step 400. Values for use in subsequent iterations will be discussed below.

At a step 420, timing characteristics of the interface components of the one instance of the circuitry element (which is currently being laid out by the EDA tool) are detected.

At a step 430, those detected timing characteristics such as interface delays are applied to the complementary interface components of adjacent instances of the circuitry element, as timing parameters (in the layout process) in place of the values set as the initial values at the step 400.

At a step 440, a test is carried out to compare the detected timing characteristics (including those applied as timing parameters to the complementary interface components of adjacent instances) with a required communication cycle time to detect whether communication can take place between the interface components and complementary interface components (of the adjacent instance) within the required communication cycle time. If the answer is yes then control passes to a step 450 to be discussed below. If the answer is no then control returns to the generating step 410, at which the layout of the one instance is re-prepared (that is to say, the generating step is repeated) by the EDA tool using the timing parameters applied to the next adjacent instances at the step 430 in place of the initial values set at the step 400.

As control passes to the step 450, it has been detected that the input and output interfaces of an instance of the circuitry element can carry out their data communication within the timing constraints, given that the complementary interface components of the next adjacent elements are the same as interface components of the element being modelled. On this basis, the layout is applied to the other instances of the circuitry element. At a step 460, the layout is finalised, for example by including other layout items such as the top level logic 20 and the interfaces 30 discussed above.

The flowchart process can stop there, with its product being a finalised integrated circuit layout. However, optionally, a further step of manufacturing an integrated circuit according to the layout (such as the integrated circuit 10) can be performed at a step 470. Therefore, the loop of the steps 410 to 440 can involve an iterative repetition of the generation of a layout until the comparison carried out at the step 440 detects that communication can take place between interface components of the instance of the circuitry element being laid out and complementary interface components (with which it will communicate in operation) within the required communication cycle time.

When the step 470 is included, FIG. 4 provides an example of a computer-implemented method of manufacturing an integrated circuit comprising, using a computer, producing an integrated circuit layout for multiple instances of a circuitry element as discussed above.

Figure 5:
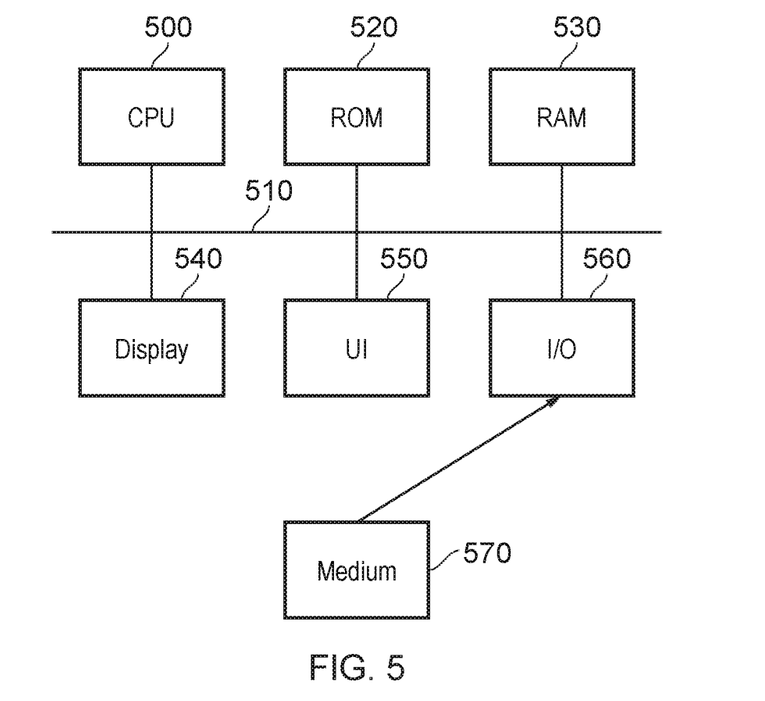
FIG. 5 schematically illustrates an integrated circuit design apparatus.

FIG. 5 schematically illustrates an integrated circuit design apparatus comprising a processor 500 connected, via a bus structure 510 to other circuitry items such as a read only memory 520, a random access memory 530, a display 540, a user interface 550 and input/output circuitry 560. As an example, the input/output circuitry 560 can access a non-transitory machine-readable storage medium 570 storing program instructions which, when executed by the computer processor 500, cause the computer processor to carry out the method of FIG. 4, as for as the step 460. In this way, the arrangement of FIG. 5 provides an integrated circuit design apparatus comprising a computer processor (such as the processor 500) configured to operate according to program instructions (such as the instruction stored by the machine-readable non-transitory storage medium 570) which, when executed by the computer processor, cause the computer processor to carry out the method steps of FIG. 4.

In a practical implementation, an EDA tool, for example, running as computer processable instructions (provided by the medium 570) on the apparatus of FIG. 5, may operate automatically under the overall control of a computer-executable script or other set of instructions which controls the iterative execution of the loop of the steps 410 . . . 440 until the timing constraints are complied with at the step 440, and then controls the execution of the successive steps 450-460. The step 470 can be carried out by a known fabrication apparatus. An integrated circuit such as that shown in FIG. 1 can be produced, for example.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the present techniques have been described in detail herein with reference to the accompanying drawings, it is to be understood that the present techniques are not limited to those precise embodiments, and that various changes, additions and modifications can be effected therein by one skilled in the art without departing from the scope and spirit of the techniques as defined by the appended claims. For example, various combinations of the features of the dependent claims could be made with the features of the independent claims without departing from the scope of the present techniques.

The invention claimed is:

1. A computer-implemented method of integrated circuit design, said method comprising:
    using a computer, producing an integrated circuit layout for multiple instances of a circuitry element, wherein interface components in one instance of said circuitry element communicate with complementary interface components in an adjacent instance of said circuitry element, said interface components being identical between said multiple instances;
    said producing step comprising:
    for one instance of said circuitry element, the following steps:
        generating an integrated circuit layout for said one instance of said circuitry element on the basis of timing parameters of said complementary interface components with which said one instance communicates in use;
        detecting timing characteristics of said interface components of said one instance of said circuitry element;
        applying said detected timing characteristics as said timing parameters of said complementary interface components in said adjacent instance of said circuitry element; and
        repeating said generating step on the basis of said timing parameters applied by said applying step until said detected timing characteristics comply with a required communication cycle time so that communication can take place between said interface components and said complementary interface components of said adjacent instance within said required communication cycle time; and
    manufacturing an integrated circuit using the integrated circuit layout produced.

2. The method of claim 1, wherein said repeating step comprises:
    comparing said detected timing characteristics with a required communications cycle time to detect whether communication can take place between said interface components and said complementary interface components within said required communications cycle time; and
    repeating said generating step when said comparing step detects that communication cannot take place between said interface components and said complementary interface components within said required communications cycle time.

3. The method of claim 2, wherein said repeating step comprises iteratively repeating said generating step until said comparing step detects that communication can take place between said interface components and said complementary interface components within said required communications cycle time.

4. The method of claim 1, wherein said instances of said circuitry element are identical between said multiple instances.

5. The method of claim 1, wherein:
    said interface components of said one instance of said circuitry element comprise:
    input components, said complementary interface components in said adjacent instance being output components; and
    output components, said complementary interface components in said adjacent instance being input components.

6. The method of claim 1, in which said circuitry elements are processor cores.

7. The method of claim 1, wherein said generating step comprises selecting one or both of a layout and a component structure of one or more of said interface components.

8. A computer-implemented method of manufacturing an integrated circuit comprising:
    using a computer, producing an integrated circuit layout for multiple instances of a circuitry element, wherein interface components in one instance of said circuitry element communicate with complementary interface components in an adjacent instance of said circuitry element, said interface components being identical between said multiple instances;

said producing step comprising:

for one instance of said circuitry element, the following steps:

generating an integrated circuit layout for said one instance of said circuitry element on said basis of timing parameters of said complementary interface components with which said one instance communicates in use;

detecting timing characteristics of said interface components of said one instance of said circuitry element;

applying said detected timing characteristics as said timing parameters of said complementary interface components in said adjacent instance of said circuitry element;

repeating said generating step on the basis of said timing parameters applied by said applying step until said detected timing characteristics comply with a required communication cycle time so that communication can take place between said interface components and said complementary interface components of said adjacent instance within said required communication cycle time; and using said layout generated for said one instance for each of said multiple instances of said circuitry element; and manufacturing said integrated circuit using said layout generated by said producing step.

* * * * *